W. WEAVER.
Lids for Stoves.
No. 158,551.
Patented Jan. 5, 1875.
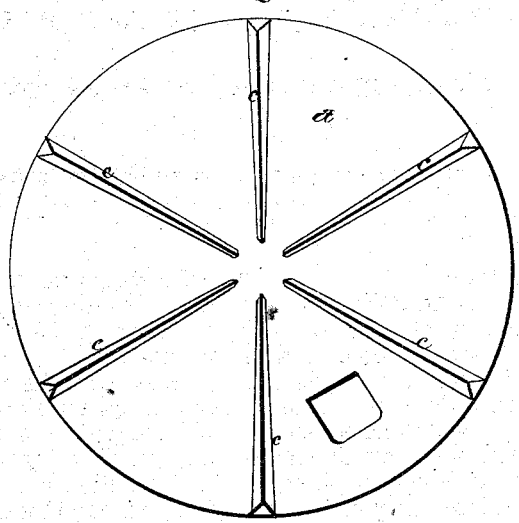
WITNESSES.
INVENTOR.
Wm Weaver
by F. A. Lehmann
Atty

UNITED STATES PATENT OFFICE.

WILLIAM WEAVER, OF PHŒNIXVILLE, PENNSYLVANIA.

IMPROVEMENT IN LIDS FOR STOVES.

Specification forming part of Letters Patent No. 158,551, dated January 5, 1875; application filed December 16, 1874.

*To all whom it may concern:*

Be it known that I, WILLIAM WEAVER, of Phœnixville, in the county of Chester and State of Pennsylvania, have invented certain new and useful Improvements in Lids for Stoves and Ranges; and I do hereby declare the following to be a full, clear, and exact description of the invention, such as will enable others skilled in the art to which it pertains to make and use it, reference being had to the accompanying drawings, which form part of this specification.

My invention relates to an improvement in stove-lids; and it consists in forming a number of radial ribs or flanges upon the top of plate, which flanges are sharp on their top edges, so as to present as little heating-surface as possible to the utensil placed upon them, and are made tapering from their outer ends toward the center, so that they will afford the utensils but a single point of contact, and this at the outer edge of the utensil, where they are always thickest.

Figure 1 is a plan view of my invention. Fig. 2 is a cross-section of the same.

*a* represents an ordinary stove-lid, upon the top of which are formed a number of tapering radial flanges or ribs, *c*, which may be arranged in any desired relation to each other. These flanges are all made V-shaped, so as to present only a sharp edge to the utensils placed upon them, and thus bring the bottom of the utensil in contact with as small a heating-surface as possible. The flanges are also made thicker at their outer ends than their inner ones, so as to form a regular incline, and thus offer but a single point of contact to the utensils, and this always at the outer edge, where the utensil is thickest and best adapted to stand the heat.

When utensils made of crockery-ware are placed upon the ordinary flat plates, the sudden unequal expansion and contraction causes the utensil to break. In order to prevent this the utensils have been made with scolloped flanges around their bottoms, so as to raise them up above the plate, and present but a small surface to the plate to be affected by expansion and contraction. This, however, has been found not only to be expensive but ineffectual. This great defect my flanges entirely overcome, as articles of the most delicate construction can be placed upon the plates with perfect safety, and metallic utensils of all kinds are prevented from being burned or injured.

Instead of continuous tapering flanges, as shown, detached points or projections may be used, but not with as great an advantage.

I am aware that rings have been attached to the plates or lids for the same purpose, and these I disclaim.

Having thus described my invention, I claim—

As a new article of manufacture, a stove-plate, *a*, having a number of radial flanges formed upon its top, substantially as shown.

In testimony that I claim the foregoing I have hereunto set my hand this 16th day of December, 1874.

WILLIAM WEAVER.

Witnesses:
   F. A. LEHMANN,
   W. T. HUTCHINSON.